(12) United States Patent
Sullivan et al.

(10) Patent No.: US 7,573,475 B2
(45) Date of Patent: Aug. 11, 2009

(54) 2D TO 3D IMAGE CONVERSION

(75) Inventors: Steve Sullivan, San Francisco, CA (US); Alan D. Trombla, Fairfax, CA (US); Francesco G. Callari, San Francisco, CA (US)

(73) Assignee: Industrial Light & Magic, San Francisco, CA (US)

( * ) Notice: Subject to any disclaimer, the term of this patent is extended or adjusted under 35 U.S.C. 154(b) by 511 days.

(21) Appl. No.: 11/445,947

(22) Filed: Jun. 1, 2006

(65) Prior Publication Data

US 2007/0279415 A1    Dec. 6, 2007

(51) Int. Cl.
*G06T 15/10* (2006.01)
(52) U.S. Cl. .................. 345/427; 345/419; 345/426; 345/581; 345/646; 345/647; 352/57
(58) Field of Classification Search ............... 345/419, 345/426, 427, 581, 646, 647
See application file for complete search history.

(56) References Cited

U.S. PATENT DOCUMENTS

| | | | |
|---|---|---|---|
| 4,156,914 A | 5/1979 | Westell | |
| 4,972,359 A | 11/1990 | Silver et al. | |
| 5,613,048 A | 3/1997 | Chen et al. | |
| 5,699,152 A | * 12/1997 | Fedor et al. | ............... 356/240.1 |
| 6,014,472 A | 1/2000 | Minami | |
| 6,208,348 B1 | 3/2001 | Kaye | |
| 6,477,267 B1 | 11/2002 | Richards | |
| 6,515,659 B1 | 2/2003 | Kaye et al. | |
| 6,686,926 B1 | 2/2004 | Kaye | |
| 6,928,196 B1 | 8/2005 | Bradley et al. | |
| 7,102,633 B2 | 9/2006 | Kaye et al. | |
| 7,116,323 B2 | 10/2006 | Kaye et al. | |
| 7,116,324 B2 | 10/2006 | Kaye et al. | |
| 7,254,265 B2 | 8/2007 | Naske | |
| 2003/0128871 A1 | 7/2003 | Naske et al. | |
| 2004/0239670 A1 | 12/2004 | Marks | |
| 2005/0099414 A1 | 5/2005 | Kaye et al. | |

(Continued)

FOREIGN PATENT DOCUMENTS

EP    1 176 559    1/2002

(Continued)

OTHER PUBLICATIONS

Bao et al., "Non-linear View Interpolation," *J. Visualization Comp. Animation*, 1999, 10:233-241.

(Continued)

*Primary Examiner*—Kimbinh T Nguyen
(74) *Attorney, Agent, or Firm*—Fish & Richardson P.C.

(57) ABSTRACT

A method of creating a complementary stereoscopic image pair is described. The method includes receiving a first 2D image comprising image data, where the first 2D image is captured from a first camera location. The method also includes projecting at least a portion of the first 2D image onto computer-generated geometry. The image data has depth values associated with the computer-generated geometry. The system includes rendering, using the computer-generated geometry and a second camera location that differs from the first camera location, a second 2-D image that is stereoscopically complementary to the first 2-D image, and infilling image data that is absent from the second 2-D image.

38 Claims, 13 Drawing Sheets

U.S. PATENT DOCUMENTS

| | | |
|---|---|---|
| 2005/0104878 A1 | 5/2005 | Kaye et al. |
| 2005/0104879 A1 | 5/2005 | Kaye et al. |
| 2005/0117215 A1* | 6/2005 | Lange .................... 359/462 |
| 2005/0146521 A1 | 7/2005 | Kaye et al. |
| 2005/0231505 A1 | 10/2005 | Kaye et al. |

FOREIGN PATENT DOCUMENTS

| | | |
|---|---|---|
| KR | 20070042989 | 4/2007 |
| WO | WO/2005084298 | 9/2005 |
| WO | WO 2006/078237 | 7/2006 |
| WO | WO/2006078249 | 7/2006 |
| WO | WO/2006078250 | 7/2006 |

OTHER PUBLICATIONS

Bao et al., "Non-linear View Interpolation," Computer Graphics and Applications, *Pacific Graphics '98 Sixth Pacific Conference*, 1998, pp. 61-69, 225.

Chen and Williams, "View Interpolation for Image Synthesis," *Proc. Of the 20th Annual Conference on Computer Graphics and Interactive Techniques*, 1993, 279-288.

Fu et al., "An Accelerated Rendering Algorithm for Stereoscopic Display," *Comp. & Graphics*, 1996, 20(2):223-229.

McMillan and Bishop, "Head-tracked stereoscopic display using image warping," *Stereoscopic Displays and Virtual Reality Systems II*, Fisher et al. (eds.), SPIE Proceedings 2409, San Jose, CA, Feb. 5-10, 1995, pp. 21-30.

Raskar, "Projectors: Advanced Graphics and Vision Techniques," SIGGRAPH 2004 Course 22 Notes, 166 pages.

Sawhney et al., "Hybrid Stereo Camera: An IBR Approach for Synthesis of Very High Resolution Stereoscopic Image Sequences," ACM SIGGRAPH 2001, Aug. 12-17, 2001, Los Angeles, CA, USA, pp. 451-460.

Deskowitz, Chicken Little Goes 3-D With Help from ILM, "*VFX World*", (Nov. 7, 2005) 2 pages.

U.S. Appl. No. 11/446,576, filed Jun. 1, 2006, Non-final Office Action, mailed Feb. 27, 2008, 26 pages.

U.S. Appl. No. 11/446,576, filed Jun. 1, 2006, response to Feb. 27, 2008 Non-final Office Action, 14 pages.

U.S. Appl. No. 11/446,576, filed Jun. 1, 2006, Non-final Office Action, mailed Sep. 12, 2008, 10 pages.

U.S. Appl. No. 11/446,576, filed Jun. 1, 2006, response to Sep. 12, 2008 Non-final Office Action, 13 pages.

U.S. Appl. No. 11/446,576, filed Jun. 1, 2006, Final Office Action, mailed Nov. 26, 2008, 11 pages.

U.S. Appl. No. 11/446,576, filed Jun. 1, 2006, response to Nov. 26, 2008 Final Office Action, 14 pages.

\* cited by examiner

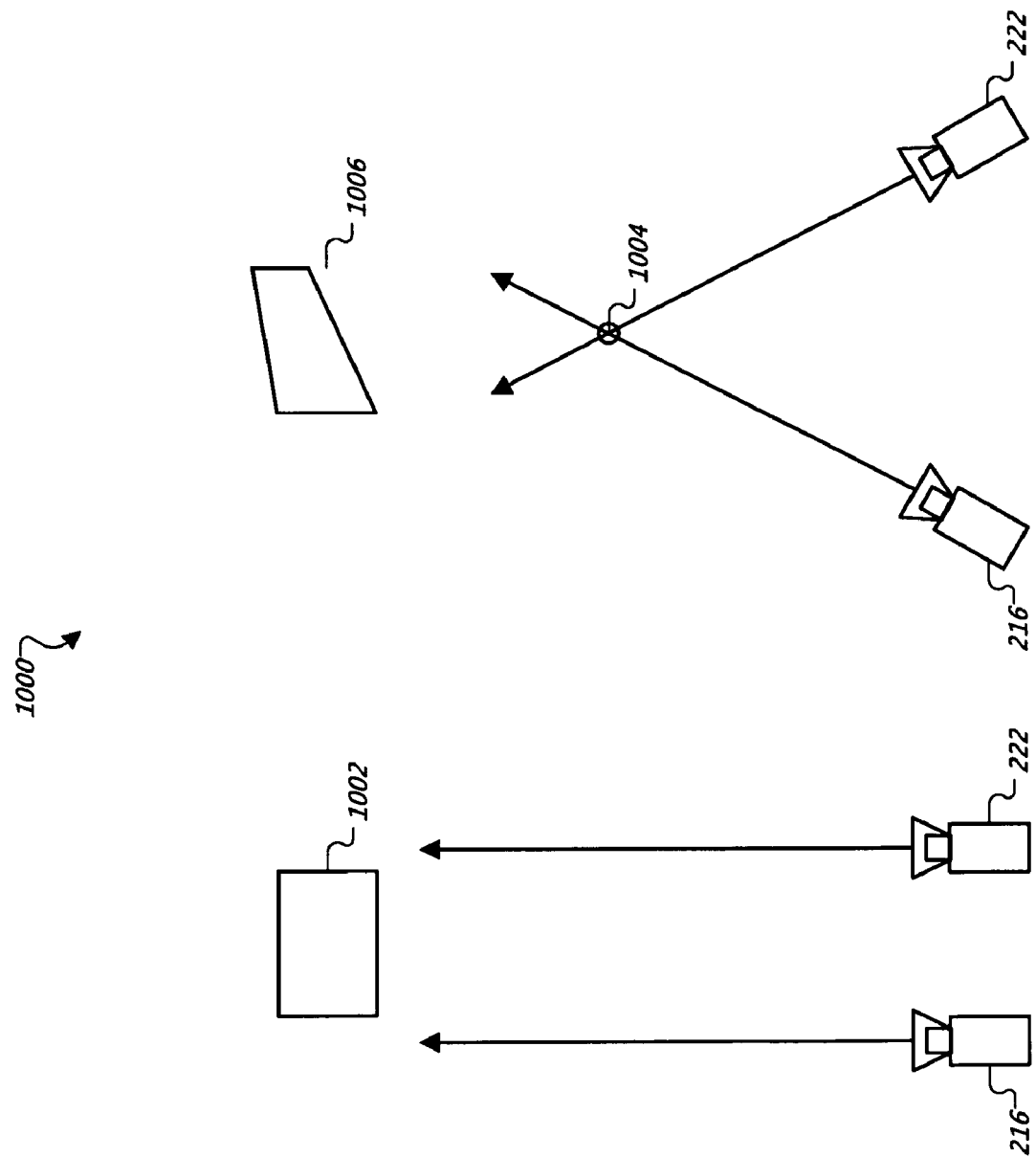

2D TO 3D IMAGE CONVERSION

CROSS REFERENCE TO RELATED CASES

This application is related to U.S. patent application Ser. No. 11/446,576 filed Jun. 1, 2006 by Davidson et al., and entitled "Infilling for 2D to 3D Image Conversion," the entirety of which is incorporated herein by reference.

TECHNICAL FIELD

This specification relates to systems and methods for 2D to 3D image conversion.

BACKGROUND

Moviegoers can view specially formatted films in three-dimensions (3D), where the objects in the film appear to project from or recede into the movie screen. Formatting the 3D films can include combining a stereo pair of left and right images that are two-dimensional. When the stereo pair of images is combined, a viewer wearing polarized glasses perceives the resulting image as three-dimensional.

SUMMARY

The present specification relates to systems and methods for converting a 2D image into a stereoscopic image pair.

In a first general aspect a method of creating a complementary stereoscopic image pair is described. The method includes receiving a first 2D image comprising image data, where the first 2D image is captured from a first camera location. The method also includes projecting at least a portion of the first 2D image onto computer-generated geometry. The image data has depth values associated with the computer-generated geometry. The system includes rendering, using the computer-generated geometry and a second camera location that differs from the first camera location, a second 2-D image that is stereoscopically complementary to the first 2-D image, and infilling image data that is absent from the second 2-D image.

In a second general aspect, a method of identifying an absence of image information when generating a complementary stereoscopic image pair is described. The method includes illuminating at least a portion of computer-generated geometry using a simulated light source positioned at a first camera location, designating a second camera at a second camera location having a viewing frustum that includes the at least a portion of the computer-generated geometry, and identifying an absence of valid image information at locations having shadows produced by the simulated light when the locations are viewed from the second camera.

In a third general aspect, a system for identifying an absence of valid pixel data in a stereoscopically complementary image is described. The system includes an interface to receive a first 2D image captured from a first camera position, a projector to project a portion of the first 2D image onto computer-generated geometry that corresponds to the portion, a rendering module to render from a second camera position a second 2D image that is stereoscopically complementary to the first 2D image using the projected portion and the computer-generated geometry, and a depth calculator to determine depths of image information in the first and second images for use in identifying an absence of valid image information in the second 2D image.

In another general aspect, a computer program product tangibly embodied in an information carrier is described. The computer program product includes instructions that, when executed, perform operations including aligning computer-generated geometry with a corresponding portion of a first 2D image captured from a first camera location, projecting the portion of the first 2D image onto the geometry, designating a second camera location that differs from the first camera location, using the geometry and the designated second camera location to render a second 2D image that is stereoscopically complementary to the first 2D image, and identifying an absence of valid image information in the second 2D image by comparing depth values of image information from the first and second 2D images.

In yet another general aspect, a method of identifying an absence of image information when generating a complementary stereoscopic image pair is described. The method includes projecting at least a portion of a first 2D image including image information onto computer-generated geometry from a first camera having a first viewing frustum at a first camera location, designating a second camera having a second viewing frustum at a second camera location. The second viewing frustum includes at least a portion of the computer-generated geometry. The method also includes determining depth values associated with the image information in the first viewing frustum and in the second viewing frustum, wherein each of the depth values indicates a distance between one of the cameras and a point in the projected first 2D image in the viewing frustum for the associated camera, and identifying an absence of valid image information by comparing the depth values for corresponding points of the projected first 2D image in the first and second viewing frustums.

The systems and techniques described here may provide one or more of the following advantages. First, a system may effectively associate image information elements with depth values that lack a description of their three-dimensional geometry or position, which can increase the flexibility of the system and the speed of 2D-to-3D conversion processes. Second, a system can produce a visually compelling stereoscopic image pair even when the focal axes of the stereo cameras are not parallel. Third, a system can produce a visually compelling second view using unoccluded portions of an image that are associated with other portions of the image that are geometrically occluded when viewed from a first camera.

The details of one or more embodiments of systems and methods for 2D to 3D image conversion are set forth in the accompanying drawings and the description below. Other features and advantages of the embodiments will be apparent from the description and drawings, and from the claims.

DESCRIPTION OF DRAWINGS

FIG. 10 is a schematic diagram illustrating a difference in camera orientation.

Like reference symbols in the various drawings indicate like elements.

DETAILED DESCRIPTION

Figure 1:
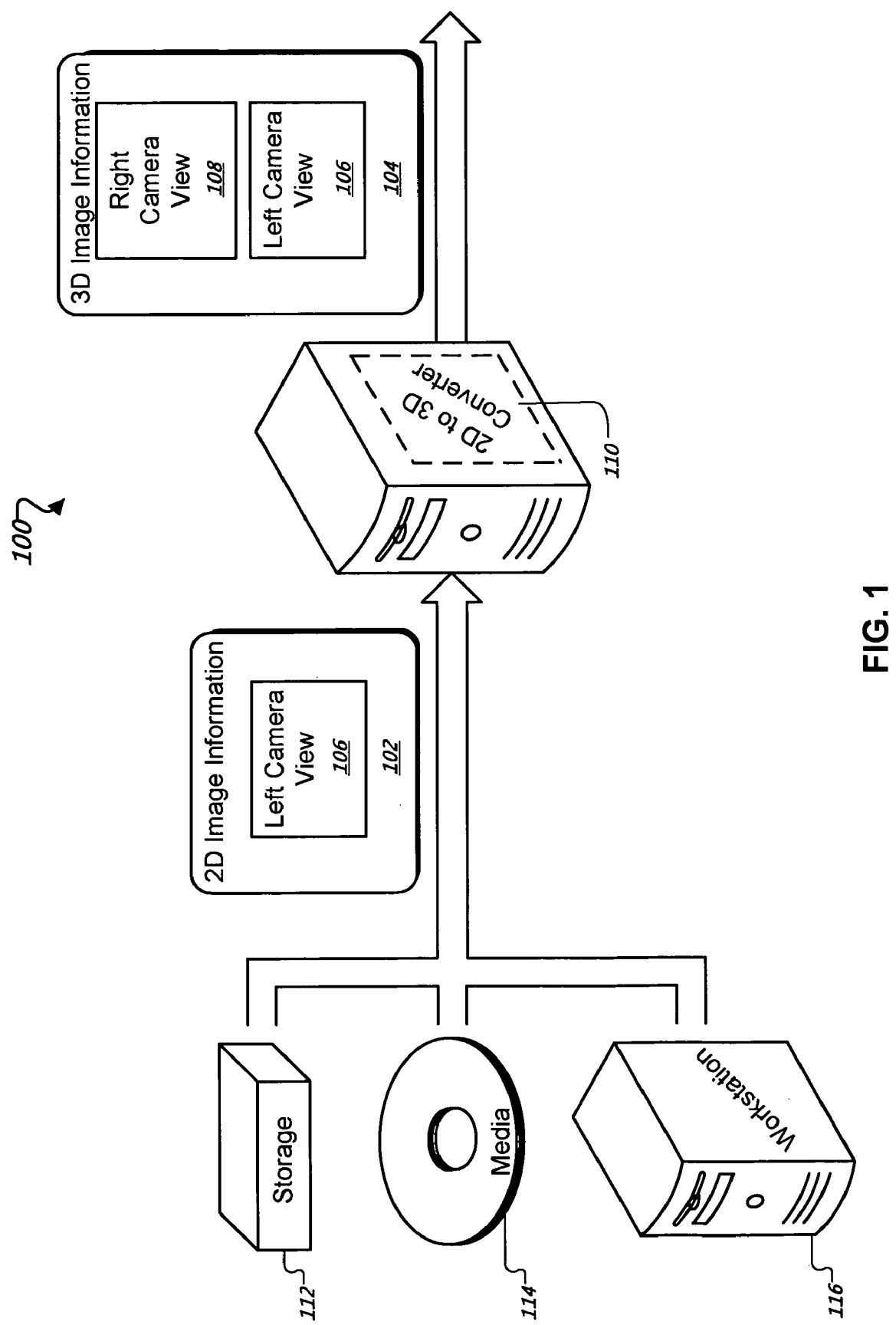
FIG. 1 is a schematic diagram of an example of a system for generating 3D image information.

FIG. 1 illustrates a system 100 for converting 2D image information 102 to a stereoscopic pair of images that may be perceived by a viewer as three-dimensional. The stereoscopic pair of images is referred to as 3D image information 104. The system 100 can generate a stereoscopic image pair by aligning computer-generated geometry that corresponds to objects shown in a first 2D image included in the 2D image information 102. The first 2D image can be projected on the geometry, and a second camera that is offset from the first camera can render a second 2D image that is complementary to the first 2D image. Image data projected from the first camera may not be visible from the second camera (e.g., due to occlusion the image data by geometry), can be generated using infilling techniques described in more detail below. The first 2D image and the second 2D image can be viewed together as a stereoscopic image pair that can be consistent with an actual 3D scene.

In certain embodiments, the 2D image information 102 includes a first camera view, such as a left camera view 106, which is used to create a second camera view, such as a right camera view 108. Combining the left camera view 106 and the right camera view 108 can produce stereoscopic 3D image information 104. A 2D-to-3D converter 110 can receive 2D information 102 from a variety of sources, for example, external or removable storage 112, optical media 114, another workstation 116, or a combination thereof.

The 2D-to-3D converter 110 can use the 2D information 102 to generate the right camera view 108. In certain embodiments, generation of the right camera view 108 can result in areas that lack valid data. Infilling, which is illustrated in FIG. 7 and described in more detail in FIG. 8, can use valid pixel data from surrounding areas to fill in the areas that lack valid data.

The 2D-to-3D converter 110 can combine the left camera view 106 and the right camera 108 view to create 3D image information 104. The 3D image information 104 can be used to generate stereoscopic images that appear in three dimensions when viewed with stereoscopic glasses, such as Real D's Cinema glasses, manufactured by Real D, Inc. of Beverly Hills, Calif.

Figure 2:
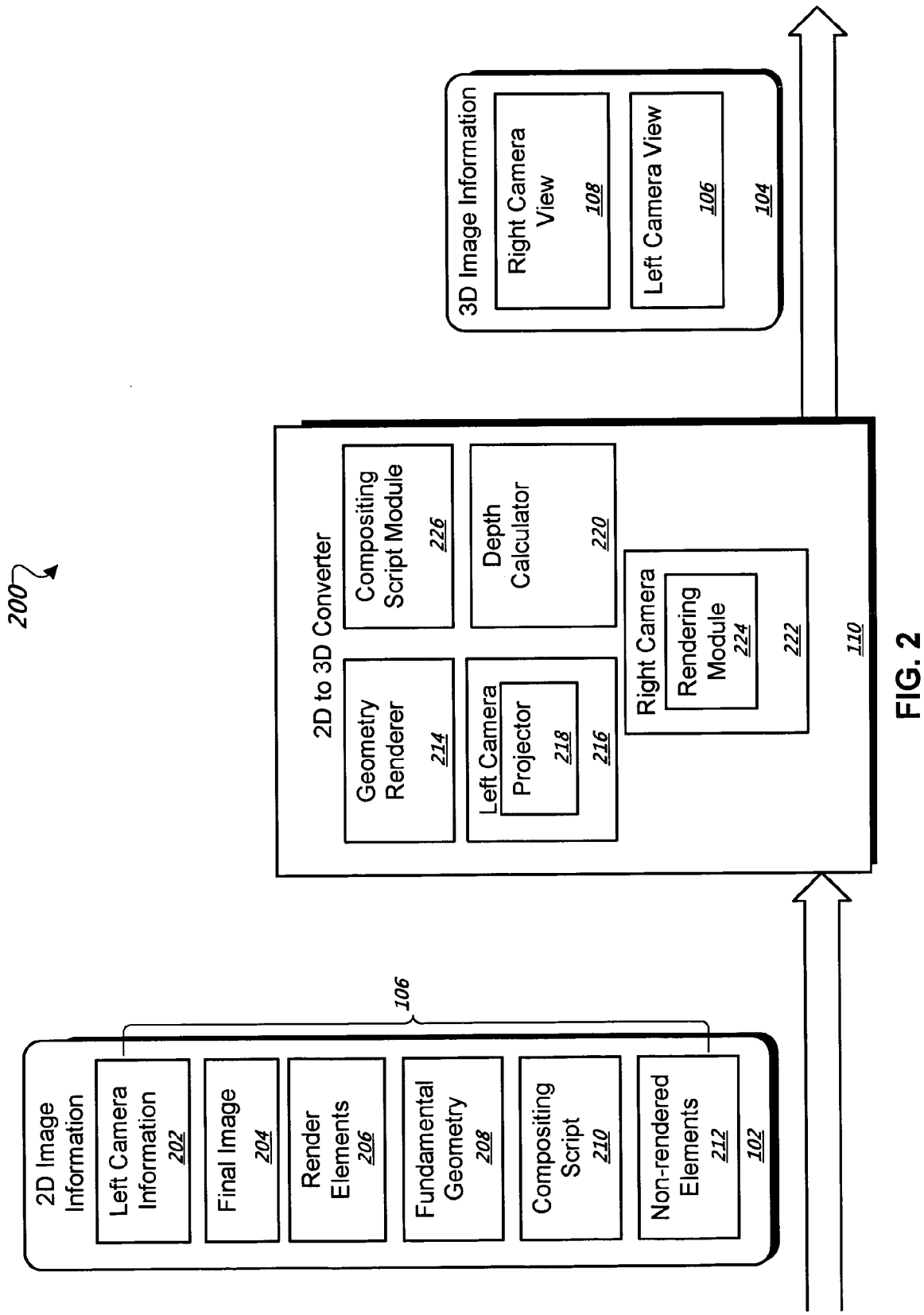
FIG. 2 is a block diagram of an example of a 2D-to-3D converter shown in the system of FIG. 1.

FIG. 2 illustrates an example 200 of a 2D-to-3D converter 110, which receives 2D image information 102 and generates 3D image information 104. The 2D image information 102, shown in FIG. 2, can include left camera information 202, any number of final images 204, render elements 206, non-rendered elements 212, and optionally, a compositing script 210, such as a script generated by Shake® developed by Apple Computer Inc. (Cupertino, Calif.). The 2D image information 102 may also include or be supplemented with three-dimensional information, for example, the fundamental geometry 208. The 2D-to-3D converter 110 includes a geometry renderer 214, a left camera 216 that includes a projector 218, a depth calculator 220, a right camera 222 that includes a rendering module 224, and a compositing script module 226.

These subsystems 214-226 can be used by the 2D-to-3D converter 110 to generate a scene that includes 3D image information 104. Each 2D scene received by the 2D-to-3D converter 110 can include final images 204. Final images can include visual components of an image scene, for example, a protagonist or antagonist of a film, and the surrounding environment, such as buildings, tress, cars, etc. Each final image 204 can be associated with pieces of fundamental geometry 208. The fundamental geometry 208 can define the location of a computer-generated object in three-space and can include one or more rendered elements 206.

Each rendered element can include color and texture information. For example, a final image of a car can be associated with fundamental geometry describing the shape of the car. The fundamental geometry of the car can include rendered elements, such as a cube for the body and spheres for the wheels. The rendered body element can include properties, for example a metallic red texture, and the rendered wheel elements can include properties, such as a black matte rubber-like texture.

Final images can also be associated with non-rendered elements 212 that are not associated with fundamental geometry (e.g., hair, or smoke), and thus may not be defined in three-dimensional space.

The compositing script module 210 can use the final images 204, the fundamental geometry 208, and non-rendered elements 212 to generate timing information used to correctly composite a scene. Timing information can specify the rate at which different objects move within a scene and the object's position at various times. The systems and techniques described in this specification can improve the consistency of the second, or right image, when viewed over a series of sequential frames. This can decrease the appearance of jitter, or noise, between the frames when the series of frames is viewed as a film.

For example, a scene can include a person walking to the left of the scene, a person walking to the right of a scene, and an object falling from the top of scene. If a scene designer wants both individuals simultaneously to arrive at the center of a frame so that the falling object hits them, the compositing script module 210 uses timing information included in the compositing script to coordinate the necessary placement of objects. If the object falls too quickly, the timing information associated with the falling object may be changed to slow the descent of the object. The rate at which either the person walking to the right or the person walking to the left can also be modified so that they meet at the same time the falling object reaches them.

In certain embodiments, a compositing script module 210, such as Shake® is used. The compositing script module 210 can use a compositing script that can include a set of operations that, when executed, create the composited scene. The operations can include color correction, keying, and various image transform operations. Color correction is an operation that can allow the artist to modify the color of a scene, for instance adding more blue to a sky scene. Keying is a compositing technique that can combine two images, for instance, the sky image can be combined with an image of a car in front of a "blue screen" or "green screen" to create an image of the car in front of the sky image. Image operations can include image rotation, image scaling, and image repositioning. For instance, an image transform operation can scale the keyed image of the car and sky to increase its size to two times its original size, or in another example, the image transform operation can rotate the keyed image 180 degrees such that the image is turned upside down.

Operations can be viewed in context, allowing the end results of an operation to be viewed while the user configures the properties of the operation. The compositing script module 210 may permit the final images 204 to be unaffected by changes in scene timing. For example, a scene consisting of two cars, where the first car is supposed to jump off a ramp, and the second car is supposed to simultaneously drive underneath the jumping car. In certain timing structures, the jumping car may reach the ramp too quickly or too slowly, throwing off the desired effect of the scene. In cases where the scene timing is incorrect, the compositing script may be changed using the new timing information, and the final images 204 may not need to be re-rendered. Timing changes can come from a variety of sources, for example, at a request by a film director.

Figure 3:
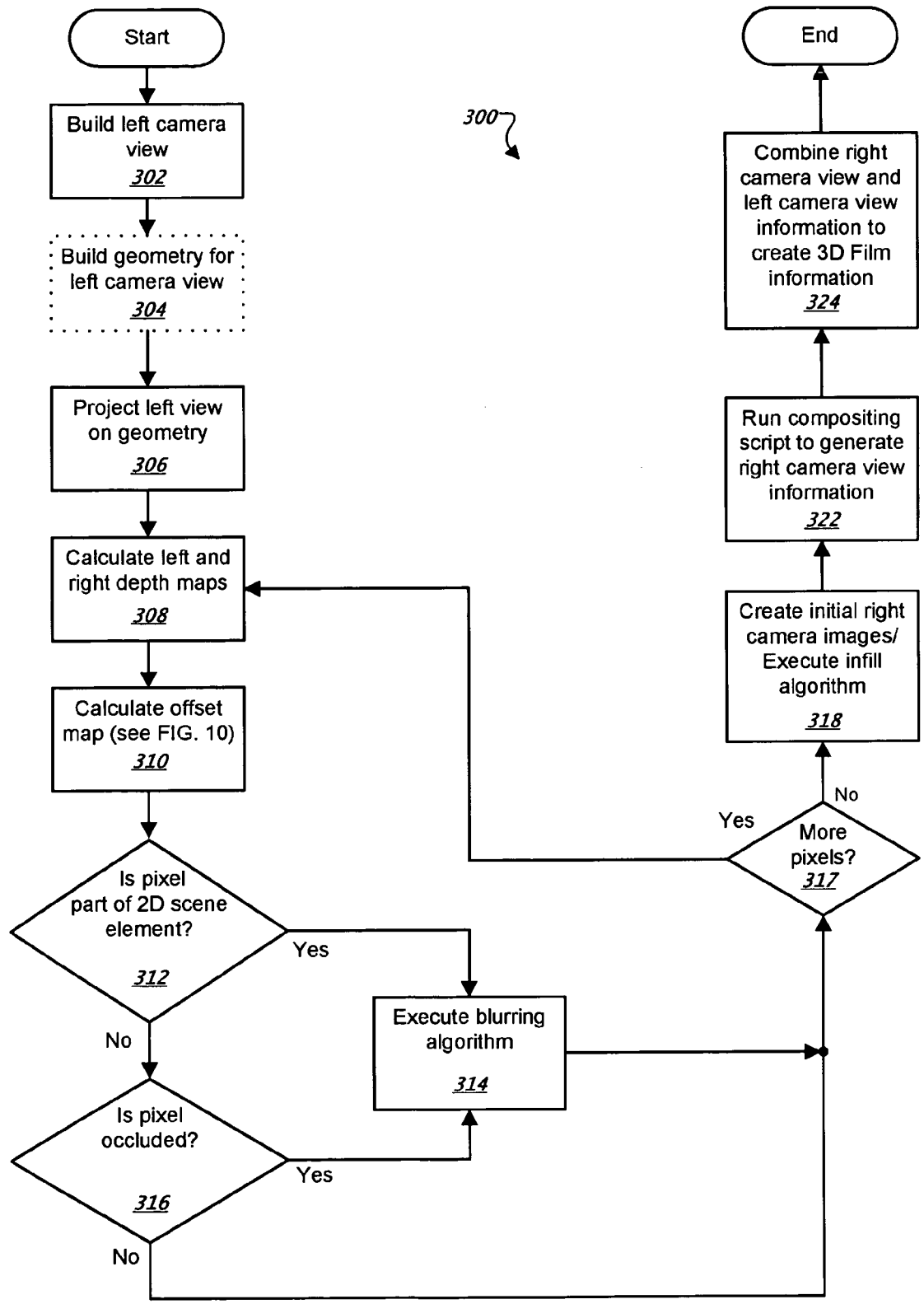
FIG. 3 is a flow chart illustrating a method for creating 3D image information.

FIG. 3 illustrates a method 300 for creating 3D image information 104. The 2D-to-3D converter 110 can generate a left camera, as shown by step 302. In certain embodiments, this includes receiving the left camera information 202, such as the camera's aspect ratio, field of view, view vector, and position. The 2D-to-3D converter 110 can create the left camera 216 with the left camera information 202.

The 2D-to-3D converter 110 may optionally build fundamental geometry 208 for the camera view, as shown in step 304. In certain embodiments, however, the fundamental geometry 208 can be received by the 2D-to-3D converter 110, and thus not need to be built. The projector 218 can project the left camera view's final images 204 onto the left camera view's fundamental geometry 208, as shown in step 306.

A right camera 222 can be generated by the 2D-to-3D 110 converter and positioned at a location offset relative to the left camera 216. In certain embodiments, this distance is substantially similar to the average interocular distance between the human eyes, which is approximately 6.5 cm. In other embodiments, this distance can be set by an artist to achieve a desired 3D effect, such as 1/30th of the distance between the camera and nearest object in the scene.

The right camera 222 can use the rendering module 224 to render the 2D image information's fundamental geometry 208 using the right camera 222 information. Rendering can define an object through various techniques that measure the outgoing light from the surface of an object. In certain embodiments, the rendering module 224 can render using a ray tracing technique that casts a ray to each pixel in the scene to generate an image. In other embodiments, the rendering module 224 can render using a primitive-by-primitive method, where the object is defined as a set of primitives (e.g., triangles, polygons, etc.) and each primitive is then rasterized, which converts the vector data of the primitive into a form that can be displayed. For example, using vector information that defines a cube and generating red, green and blue (RGB) color values that are displayed on a monitor.

In certain embodiments, a depth map can be created, as shown in step 308, to help identify pixels that may be occluded or missing when the stereoscopically complementary image (e.g., the right camera view 108) is created based on a given image (e.g., the left camera view 106). The depth maps can be created using rasterization and depth-buffering algorithms. A depth map can be a two-dimensional array that has the same resolution as the current image scene. For example, for each pixel located at $(X_1, Y_1)$ in the scene, there exists a location in the depth map referenced by the same $(X_1, Y_1)$ coordinates.

Each location of the depth map can contain depth information for a pixel in the scene. This depth information can also be thought of as the pixel's distance coordinate in a three-dimensional polar coordinate system. For example, after referencing the depth map, a 2D pixel at $(X_1, Y1)$ can use the depth value $Z_1$ retrieved from the depth map indexed at $(X_1, Y_1)$ to define a 3D ray oriented from the projection center of the camera to the pixel, and a 3D point at distance $Z_1$ from the optical center along the positive direction of that line. In some embodiments, the depth information may contain more than one depth value for a pixel. For example, if a transparent object includes a pixel, that pixel may be associated with multiple depths—one depth for images viewed through the object from one angle and another depth for images viewed through the object at another angle.

The depth calculator 220 can obtain the pixel depth value of a pixel in the left camera view 106 or the right camera view 108 by referencing the two-dimensional depth map for the pixel in either the left camera view 106 or the right camera view 108, respectively.

The two sets of depths values, from the left camera view 106 depth map and the right camera view 108 depth map, can be used to identify a set of corresponding pixels from each camera view where the pixels from one camera view correspond to pixels from the alternate camera view. In some embodiments, the identification proceeds as described in FIG. 5. Specifically, for each pixel of the left camera view whose distance coordinate is less than a pre-defined "background" threshold, a 3D point location is computed at step 508. A corresponding pixel location in the right camera view is computed at step 510, and compared with the right-camera field of view at step 512. If it is inside that field of view, and its distance from the right camera center is less than a pre-defined "background" threshold, then the distance itself is compared at step 522 with the distance recorded at the closest 2D pixel location in the depth map associated with the right camera. If the two distances are within a pre-determined "occlusion" threshold, the two pixel locations are said to be corresponding, otherwise both pixel locations are said to be "occluded".

After corresponding pixels are identified, the 2D-to-3D converter 110 can calculate an offset map, as shown in step 310. The offset map can be calculated by determining the change in position between a pixel in the left camera view 106 and the corresponding pixel in the right camera view 108. For example, if the coordinates of point P in the left camera view 106 are defined at (i, j), where point P is not occluded, and the right camera view 108 defines the coordinates of the point corresponding to P as (x, y), the offset map may contain the 2D vector o(x-j, y-i). This process is further explained in associated with FIG. 5.

In certain instances, pixels in the left camera view 106 may not share similar depth values with pixels in the right camera view 108. If the pixels do not share similar depth values, it may indicate the valid pixel data is missing or occluded. In certain embodiments the 2D-to-3D converter 110 can execute a blurring algorithm to modify the offset map.

In certain embodiments, the offset maps do not contain any valid depth information for the non-rendered elements 212, such as smoke. However, the depth of the non-rendered elements 212 may be similar to the depth of nearby sections of fundamental geometry 208 or rendered elements 206. For example, the depth of a feather may be similar to the depth of a head if the feather is near the head in the left camera view's final image 204.

If a pixel in the left camera view 106 is part of a non-rendered 2D scene element 212, as shown in step 312, the 2D-to-3D converter 110 can execute a blurring algorithm, as shown in step 314. The blurring algorithm can blur the offset map to correct any perceptual inaccuracies associated with the non-rendered elements 206 that may be caused by a lack of valid depth information.

In certain embodiments, the blurring algorithm is defined so that it ignores (i.e., does not use in its computation) areas of the offset map that are outside the left camera view 108, or that are occluded in the left camera view 108. In certain embodiments, the 2D-to-3D converter 110 can generate a box convolution filter to blur the offset map, where the size of the filter is measured in image pixels and the size and weights of the filter can be interactively specified by the user of the 2D-to-3D converter 110, according to the user's artistic judgment and the visual results achieved. The convolution filter can achieve its results by overlaying the filter on a pixel, and using the weighted average of the pixel's neighbors, as specified by the filter, to modify the value of the pixel.

In other embodiments, the 2D-to-3D converter 110 uses a morphological dilation algorithm to blur the offset map. This can have the affect of gradually enlarging foreground pixels and can reduce holes between foreground pixels. In other embodiments, the 2D-to-3D converter 110 can generate a non-box convolution filter (e.g., a Gaussian filter) to blur the offset map. For example, a two-dimensional Gaussian function can create a convolution matrix that is applied to the image.

In certain embodiments, the offset map can include pixels that are defined as "background," "outside," or "occluded." For example, background pixels can be pixels of the image that exist at some depth greater than a predetermined depth threshold. Outside pixels can be pixels of the image that exist, for example, in the left camera view 108 but that are the images of 3D points outside of the field of view of the right camera view 106. Occluded pixels can be pixels in the right camera view 108 that previously contained no valid pixel information in the left camera view 106 because an object in the left camera view 106 obscured the pixel that is now visible in the right camera view 108. For example, an occluded region may be in a scene with a cube in front of a sphere in a left camera view 106 such that a translated right camera view 108 could view a region between the cube and the sphere that contained no valid left camera view 106 information. If a pixel is "occluded" or "background," as shown is step 316, a gap can occur in the offset map.

Figure 4:
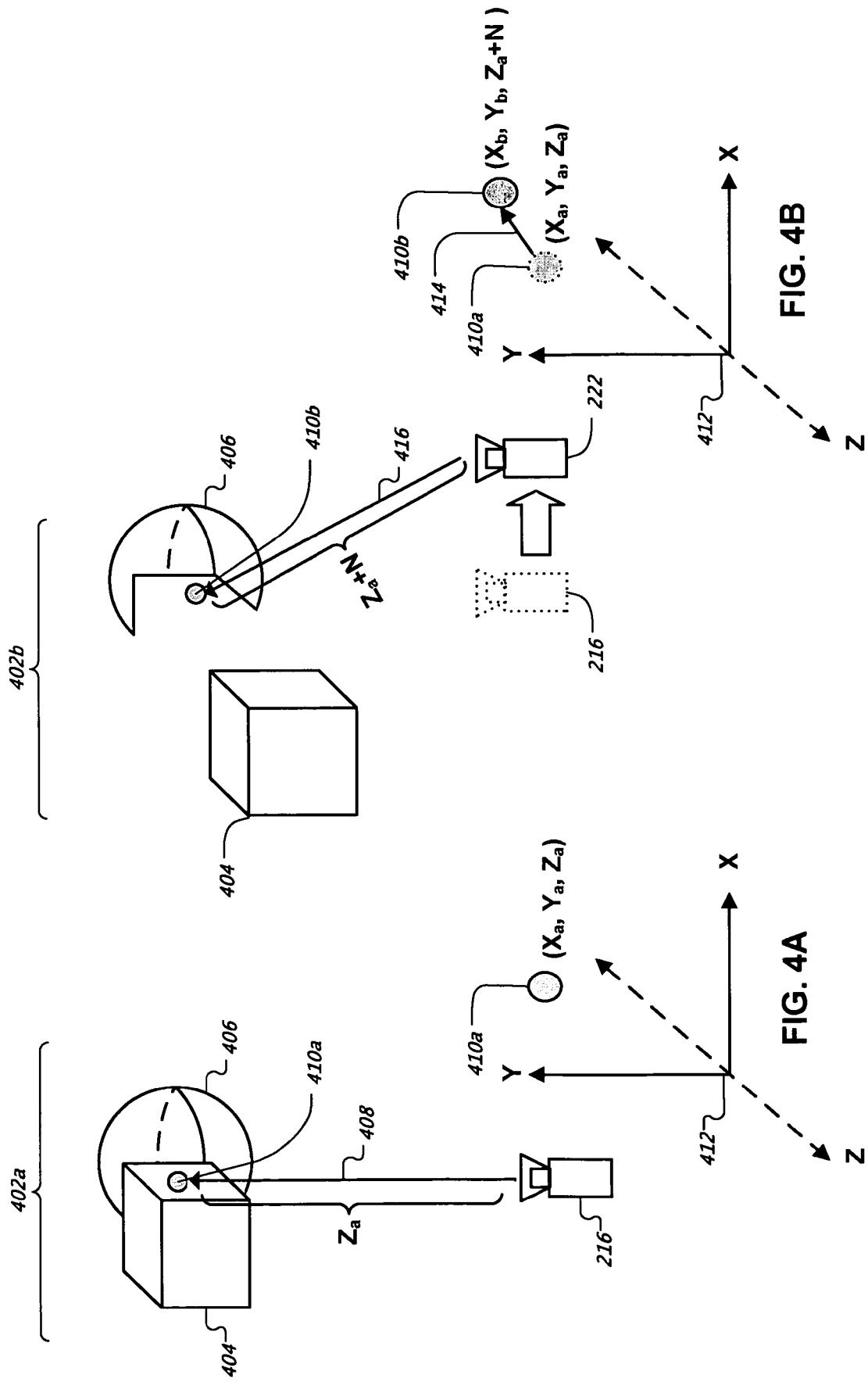
FIGS. 4A and 4B are schematic diagrams illustrating the generation of an offset map in a left camera view and a right camera view, respectively.

A gap in the offset map can include a location in the offset map that does not contain a valid offset value from a pixel in the left camera 106 view to a pixel in the right camera view 108. In certain embodiments, gaps are "filled" by executing a blurring algorithm, as shown in step 314. In other embodiments, the gaps can be filled by executing an infilling algorithm, as shown in step 318. The process of creating an offset map is explained in more detail in FIGS. 4-5.

The 2D-to-3D converter 110 can use the left camera 216 pixels' color values and the left camera view's offset map to determine a color for the right camera 222 pixels. The 2D-to-3D converter 110 can use the location of the pixels in the left camera 216 to reference the offset map. If the value of the offset map value is "background," the right camera 222 pixel color value can be set to the left pixel color value. If the offset map value is "occluded" or "outside", the right camera 222 pixel color value is set to "occluded." Otherwise, if the value of the offset map is not "background," "occluded," or "outside," the right camera 222 pixel color can be set to the color value of a pixel in the left camera near the corresponding location as defined by the value of the offset map.

If there are no more pixels to process in the left camera view 106, as show by step 317, the 2D-to-3D converter 110 can create an initial image in the right camera view 108, as shown by step 318. In certain embodiments, as shown by step 318, an infilling algorithm can fill in missing color values by using color values of the pixel's nearby unoccluded neighbor. The infilling algorithm is explained in more detail in association with FIGS. 7-9. The compositing script module 226 can create the right camera scene, using the script information provided by the 2D image information's compositing script 210, as show by step 322. For example, a Shake® module can receive the final images of the right camera view 108 and apply the script operations (e.g., color correction, keying, or transformation filters) to composite the right camera view 108. Once a predetermined number of scenes in the right camera view 108 have been constructed and composited, the left camera scenes can be combined with the corresponding right camera scenes 324 to create the 3D image information 104.

The 2D-to-3D converter 110 can, in certain embodiments, create final images in the right camera view 108 without making any modifications to the fundamental geometry 208 or rendered elements 206 associated with the left camera view 106. For example, in a scene with a final image 204 of cube and a final image 204 of a sphere, where the cube is occluding part of the sphere, the left camera view 106 does not have valid information for the whole sphere, the left camera view 106 only contains information for the part of the sphere that is not occluded by the cube. If the right camera 222 is transitioned within the scene, the right camera view 108 will not contain valid information where the cube occluded the sphere; however, this lack of valid information will be visible to the right camera 222. Using blurring and infilling techniques, the 2D-to-3D converter 110 can generate valid information between the cube and the sphere in the right camera view 222.

FIGS. 4A and 4B are schematic diagrams illustrating examples of a generation of an offset map using a left camera view 106 and a right camera view 108, respectively. In the example, there exists a left camera 216 with a field of view 402a that includes a cube 404 and a sphere 406. Relative to the left camera 216, the cube 404 is in front of the sphere 406. The left camera 216 can cast a ray, as shown by arrow 408, into the field of view 402a. In the example, the ray 408 intersects the scene at a pixel 410a. The pixel 410a has coordinates $(X_a, Y_a)$ in 2D space specifying its location in the field of view 402a. The 2D coordinates in the left camera view 106 can serve as index values into a left depth map that includes the depth value $Z_a$ for the pixel 410a. The pixel 410a can also be represented in a three-dimensional space denoted by the X-Y-Z axes 412 by the coordinates of the 3D point at distance $Z_a$ from the left camera center along the positive direction of the ray oriented from the left camera center the pixel 410a.

The 2D-to-3D converter 110 can translate the left camera's position into a right camera 222 position and can cast a ray, as shown by arrow 416, into the right camera's field of view 402b. In the example, relative to the right camera 222, the scene has changed; the cube 404 is no longer directly in front of the sphere 406. The ray 416 intersects the scene at a pixel 410b. The 2D-to-3D converter 110 can use the pixel's 410b 2D coordinates $(X_b, Y_b)$ in the right camera's field of view 402b as index values into a right depth map that includes the depth value $Z_b$, equal to $Z_a$ plus some value N, for the pixel

410b. The pixel 410b can also be represented in three-dimensional space denoted by the X-Y-Z axes 412 by the coordinates of the 3D point at distance Zb=Za+N from the right camera center along the positive direction of the ray oriented from the right camera center to pixel 410$_b$. The vector, as shown by arrow 414, denotes an offset between pixels 410a and 410b that can be calculated using a method described in FIG. 5.

Figure 5:
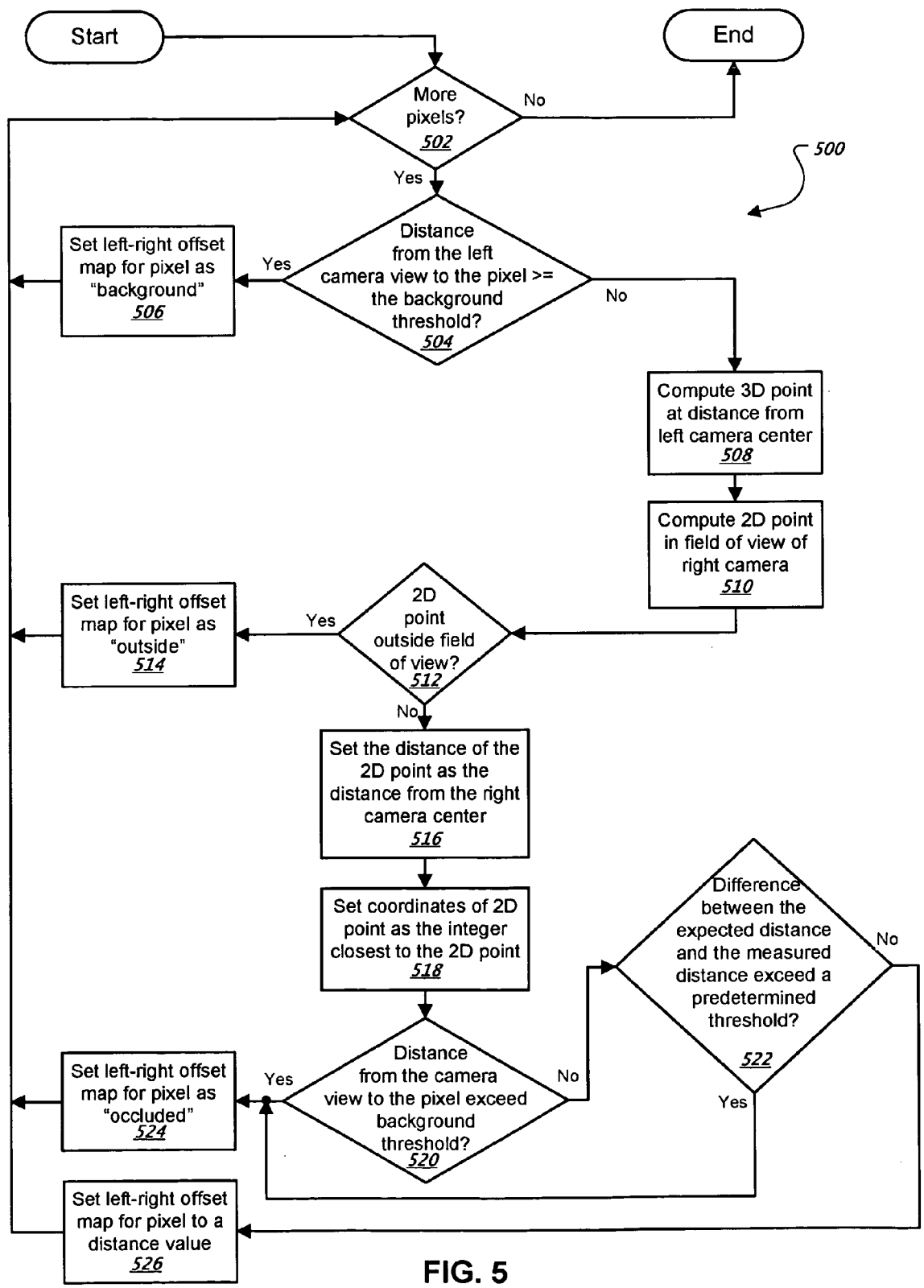
FIG. 5 is a flow chart illustrating a method for generating an offset map.

FIG. 5 illustrates a method 500 for generating an offset map. The 2D-to-3D converter 110 can use depth values, for example $Z_a$ and $Z_a$+N, to compute a left-right offset map. A left-right offset map can define the offset values from the left camera's pixels to the right camera's pixels. The left-right offset map can also include "background," "outside," or "occluded" offset values. This is explained in more detail in association with FIGS. 6A and 6B. In other embodiments, the 2D-to-3D converter can generate a right-left offset map that defines the offset from the right camera's 216 pixels to the left camera's 222 pixel.

As shown by step 504, a depth value, for example, $Z_a$ is measured and compared to a predetermined background threshold. If the depth value $Z_a$ of the left camera 216 exceeds some predetermined background threshold then the left-right offset map value indexed by the 2D pixel coordinates $(X_a, Y_a)$ is set to "background," as shown in step 506. Otherwise, as shown in step 508, the 2D-to-3D converter 110 can compute a 3D point at a distance $Z_a$ from the center of the left camera 216. In the example in FIG. 4A, the 3D point would be located at the 3D point at distance Za from the left camera center along the positive direction of the ray oriented from the right camera center to the pixel at 2D coordinates $(X_a, Y_a)$.

As shown in step 510, the 2D-to-3D converter 110 can compute a 2D point in the field of view 402b of the right camera 222. The location of the 2D point is checked to determine if the 2D point falls outside the field of view 402b of the right camera 222, as shown in step 512. If the 2D point is outside the field of view 402b of the right camera 222, the left-right offset map location indexed by the 2D pixel coordinates $(X_a, Y_a)$ is set to "outside," as shown in step 514.

If the 2D point is not outside the right camera's field of view 402b, the 2D-to-3D converter 110 can measure the distance to the 2D point, for example, the distance $Z_b=Z_a$+N from the right camera 222 center, as shown in step 516. As shown in step 518, the 2D-to-3D converter 110 can also set the coordinates of the 2D point 410b as the integer coordinates (p, q) representing the closest 2D point in the right camera's 222 field of view 402b. For example, the integer coordinates (p, q) can correspond to point $(X_b, Y_b)$. The 2D-to-3D converter 110 can use the integer coordinates (p, q) as an index value into the right depth map to find an expected distance. If the measured distance, for example, $Z_a$+N from the right camera's 222 field of view 402b to the pixel 410b exceeds a predetermined background threshold, as shown in step 520, the 2D-to-3D converter 110 can set the left-right offset map to "occluded," as shown in step 524.

The 2D-to-3D converter 110 can also set the left-right offset map to "occluded" if the absolute difference between the expected distance and the measured distance exceeds a predetermined occlusion threshold, as shown in step 522.

If the left-right offset map value indexed by the 2D pixel coordinates $(X_a, Y_a)$ is not "background" or "occluded," the 2D-to-3D converter 110 can set the left-right offset value indexed by the 2D pixel coordinates $(X_a, Y_a)$ to a value equal to the difference between the two 2D points, as shown in step 526, e.g., $(X_b-Y_a, Y_b-X_a)$ illustrated by the vector 414 in FIG. 4B.

As shown in step 502, the 2D-to-3D converter 110 can continue to process the pixels in the scene until each indexed value of the left-right offset map contains a value of either "outside," "background," "occluded," or a value that represents the offset between corresponding 2D points.

Figure 6A:
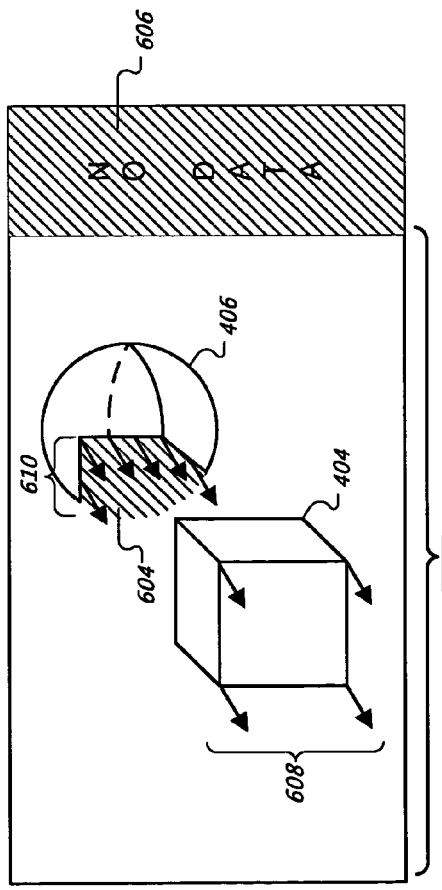
FIG. 6A is a schematic diagram illustrating a perspective view of a difference between a presence of data in a left camera view and a right camera view.
Figure 6B:
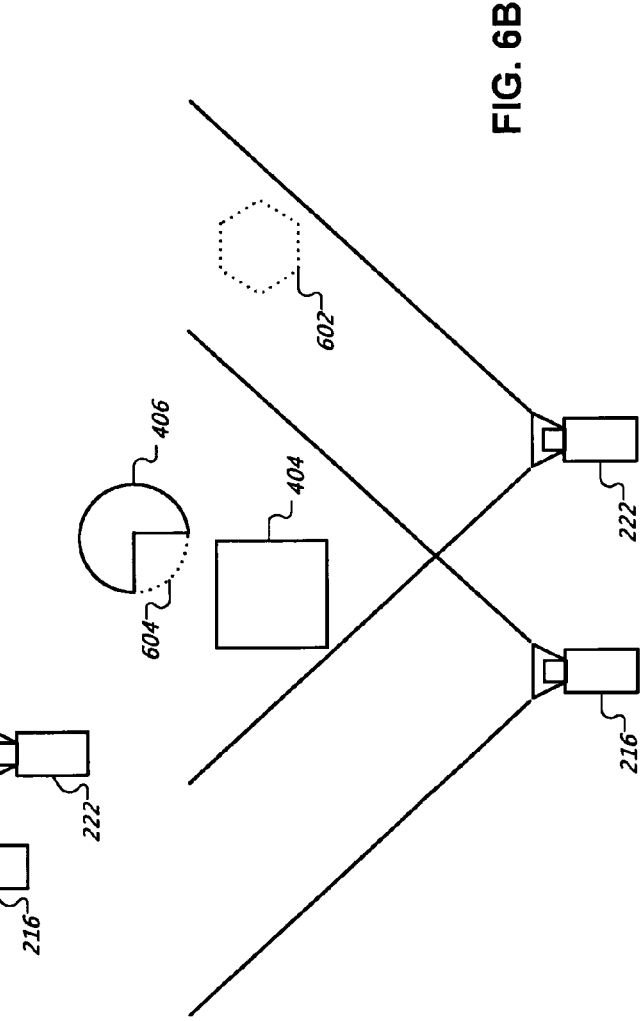
FIG. 6B is a schematic diagram illustrating a top down view of a difference between a presence of data in a left camera view and a right camera view.

FIGS. 6A and 6B illustrate a scene that includes a difference between a presence of data in a viewing frustum of the left camera 216 and a viewing frustum of the right camera 222 from a perspective view and a top down view, respectively.

The viewing frustum for each camera can include a region of the scene that is viewed by the camera. The region's shape can vary depending on what type of lens is simulated by the virtual camera. In some embodiments, the viewing frustum is a rectangular pyramid that is divided by two planes that intersect the frustum perpendicular to an optical axis for the virtual camera. The plane closest to the virtual camera can be called a near plane, and the plane farthest from the camera can be called the far plane. Objects closer to the virtual camera than the close plane or farther from the camera than the far plane may not be captured for display in certain embodiments.

Figure 7B:
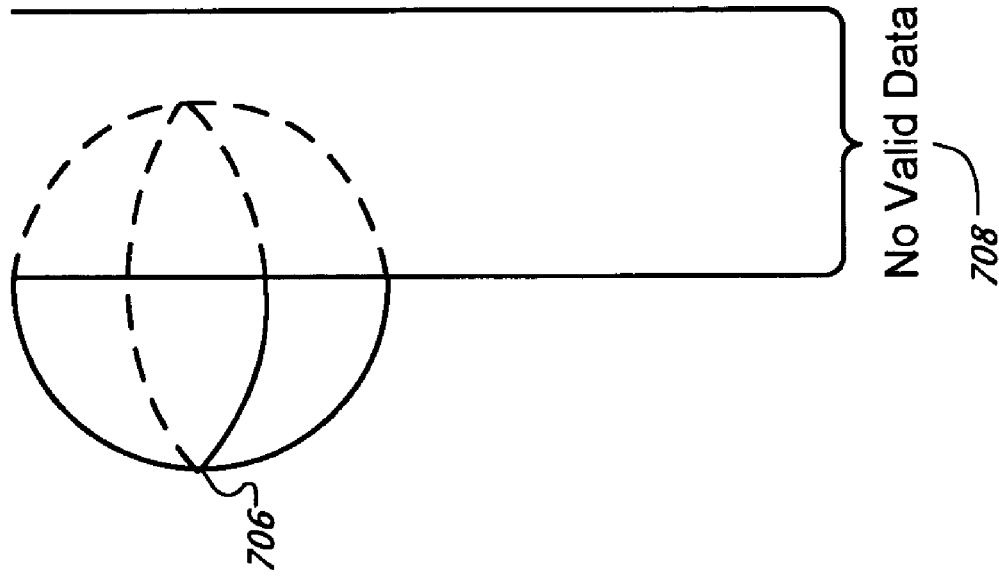
FIGS. 7A and 7B are block diagrams illustrating two approaches for filling gaps in pixel data.

The scene shown in FIGS. 6A and 7B contains information for the cube 404, the sphere 406, and a dodecahedron 602. However, based on the position of the left camera 216, only the cube 404 and the sphere 406 are included in the viewing frustum of the left camera 216, so the left camera 216 does not capture any information about the dodecahedron 602. Furthermore, due to the left camera 216 positioning, the left camera 216 only views a portion of a sphere 406 not directly behind the cube 404.

The right camera 222 is positioned such that the cube 404, the sphere, 406, and the dodecahedron 602 are within the viewing frustum of the camera 222. In the scene, the right camera 222 can also view a region 604 that the left camera 216 could not view because the cube 404 was in front of the sphere 406. The pixels in region 604 can be set in an offset map as "occluded." The offsets, indicated by braces 608 and 610 illustrate a partial set of offset values (expressed as vectors) between the left camera 222 and the right camera 216.

To fill in the offset values for the occluded pixels in region 604, the 2D-to3D-converter 110 can use the offsets, represented as arrows by the brace 610, in the blurring algorithms which can approximate the occluded offsets through the averaging techniques described previously.

In certain embodiments, the 2D-to-3D converter 110 can use the blurred offset maps to generate an "initial image", i.e. an initial approximation of the final image, with the computed offsets. To generate the initial image, the 2D-to-3D converter 110 can use the computed offsets to determine corresponding pixels and map the color values from the left camera view 106 to the right camera view 108. The 2D-to-3D converter 110 can apply an infilling procedure to the initial image with to create the final image in the right camera view 108.

Figure 7A:
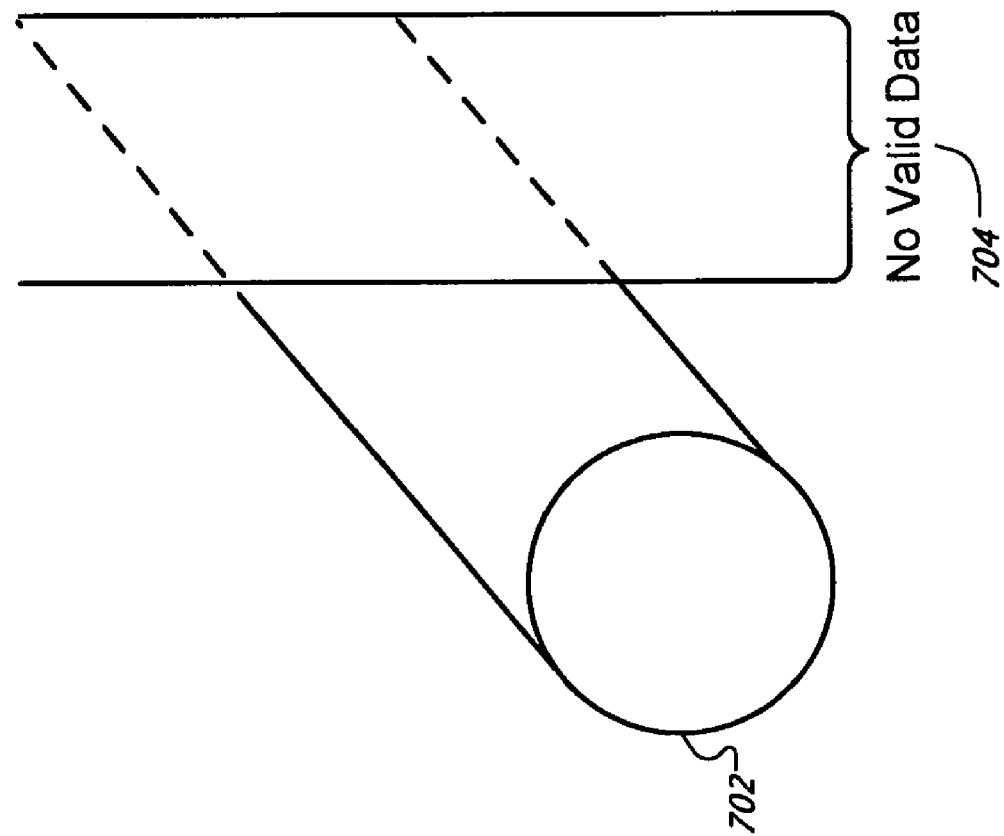

FIGS. 7A and 7B illustrate two different embodiments for infilling. FIG. 7A illustrates a certain embodiment for infilling where a nearby valid unoccluded pixel's color value is replicated into the occluded region. For example, a cylindrical object 702 can include a region of no valid data 704. In certain embodiments, the region of no valid data 704 can contain "background" or "occluded" offset values or some combination thereof as generated by the method 500 described in FIG. 5. In certain embodiments the "background" values are treated as zeros, indicating that color information for them in the right view will be collected at pixels with the same coordinates in the left view.

The 2D-to-3D converter 110 can, in certain embodiments, access the cylindrical object 702 and the region of no valid data 704 and use an infilling method to extend pixel values into the region 704 using the left-most valid pixel in the right camera view 108 as the pixel color in the occluded region. In other embodiments, the 2D-to-3D converter can use the right-most valid pixel in the right camera view 108 as the pixel color in the occluded region. In yet other embodiments, the 2D-to-3D converter 110 can use a linear combination of pixels in different rows of the right camera view 108 to infill the regions of no data for the extension technique.

FIG. 7B illustrates a certain embodiment for infilling where valid pixels are mirrored into the no valid data region 708. For example, a spherical object 706 can be intersected by the region 708. In certain embodiments, the region 708 can be "outside" or "occluded" regions or some combination thereof as generated by the method 500 described in FIG. 5.

The 2D-to-3D converter 110 can, in certain embodiments, access the spherical object 706 and the region of no valid data 708 and use an infilling method to mirror the left-most valid pixel in the right camera view 108 as the pixel color in the no data region 708. For example, in certain embodiments, if an unoccluded pixel exists at position N=(i, k) the 2D-to-3D converter 110 can set the color value of the occluded pixel (i, j) to the color of a pixel at position M=(i,2k−j).

If a pixel does not exist at position M, the 2D-to-3D converter 110 can use the nearest left-most unoccluded valid pixel to position M in the right camera view 108 as the pixel color of the occluded pixel in the right camera view 108. In other embodiments, the 2D-to-3D converter 110 can use a method for mirroring the right-most unoccluded valid pixel to position M in the right camera view 108 as the pixel color of the occluded pixel in the right camera view 108. As in the extension technique, the 2D-to-3D converter 110 can also use a linear combination of pixels in different rows of the right camera view 108 to infill the regions of no data for the mirror technique.

Figure 8A:
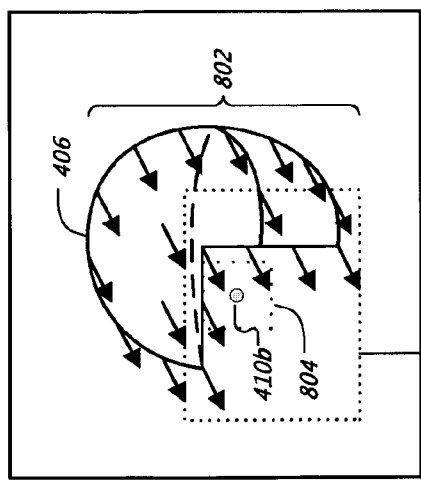
FIG. 8A is a block diagram illustrating a generation of pixel data in a right camera view where a left camera view contained no prior valid pixel data.
Figure 8B:
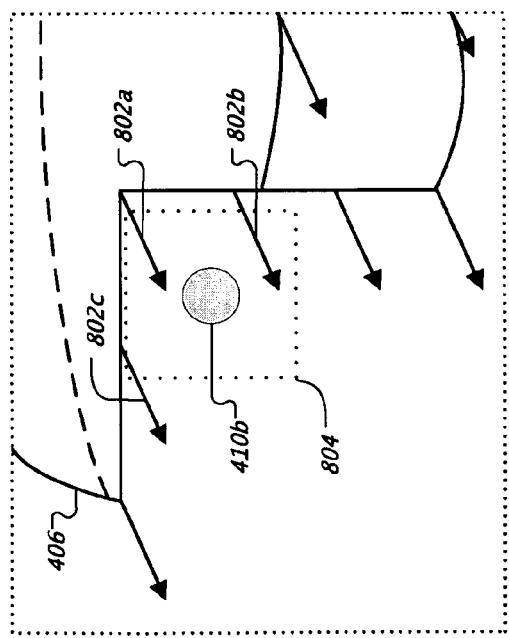
FIG. 8B is a block diagram illustrating an exploded view of the generation of pixel data shown in FIG. 8A.

FIG. 8A illustrates a generation of valid pixel data in a right camera view 108 where a corresponding left camera view 106 contained no valid pixel data. The sphere 406 in the right camera view 108 contains an area, shown as the exploded view FIG. 8B, that is missing valid pixel information. The pixel, shown as point 410b, is in a region that does not contain valid pixel information.

The 2D-to-3D converter 110 can access the sphere 406 and the offset map (shown as the set of arrows 802) and, through the blurring algorithm described previously, blur the offset map. For example, the 2D-to-3D converter 110 can use a box convolution filter 804 to blur the offset map. Based on the size and the position of the convolution filter 804, only the offsets values, shown as arrows 802a, 802b, and 802c are used in the blurring algorithm.

In certain embodiments, the 2D-to-3D converter 110 can use the blurred offset map to generate an initial image. In certain embodiments, the pixel's color value can be generated by the 2D-to-3D converter 110 by mapping the blurred offset value from the pixel 410b to a pixel in the right camera view 106. In other embodiments, the 2D-to-3D 110 converter can execute an infilling algorithm to generate the pixel's color value. In certain embodiments, the infilling algorithm can use a linear combination of pixels to infill the missing color values. For example, the 2D-to-3D converter 110 can calculate an average color value from the pixels in the right camera view 108 and assign the color value of pixel 410b to the average color value of nearby neighbors (e.g., four adjacent pixels excluding diagonal neighbors). Additionally, the 2D-to-3D converter 110 can use the mirroring or extension techniques described previously to infill the missing color values. For example, the 2D-to-3D converter 110 can set the color value of the pixel 410b to a color value that equals a color value of a nearby right-most pixel.

Figure 9A:
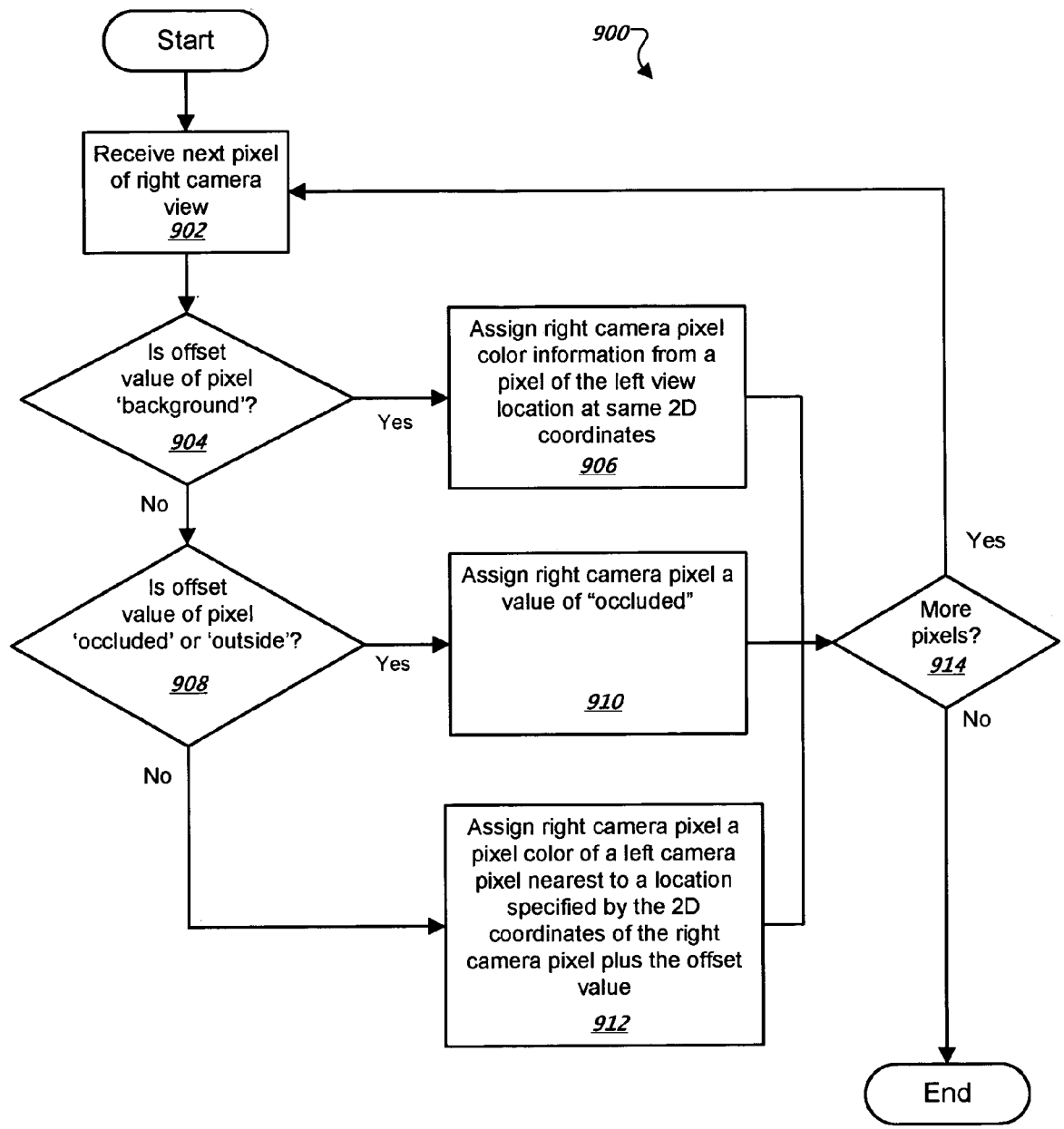
FIGS. 9A and 9B show methods for mapping pixel values to pixels included a right camera view.

FIG. 9A illustrates a method 900 for generating an initial version of the right image by remapping pixel information from the left image using a right-to-left offset map. The 2D-to-3D converter 110 can access a next pixel in the right camera view 108, as shown in step 902. If the offset value associated with the pixel in the right camera view 108 is "background," as shown by step 904, the 2D-to-3D converter can assign pixel color information obtained from a location in the left view, where the location is specified by the same 2D coordinates that specify the location of the next pixel in the right camera view, as shown in step 906.

Next, in step 908, the 2D-to-3D converter can determine if the offset value associated with the right-to-left offset map is "occluded" or "outside." If the offset value is "occluded" or "outside," the 2D-to-3D converter can assign the pixel in the right view a value of "occluded," as shown in step 910. If the offset value associated with the next right pixel is not "background," "occluded," or "outside," the 2D-to-3D converter 110 can assign to the right pixel a pixel color obtained from a pixel that is nearest a location specified in the left view by the 2D coordinates of the pixel in the right view plus the offset value associated with the next right pixel (e.g., right pixel at (x, y)=nearest left pixel to $(x+x_{offset\_value}, y+y_{offset\_value})$, as shown in step 912.

Additionally, the operations of step 912 can include other ways to remap. For example, a set of pixels that neighbor the location identified by the 2D coordinates and offset can be used to compute a pixel color for the right camera pixel. If (p, q) are the coordinates of the location, the pixels at (p+1, q), (p, q+1), and (p+1, q+1) can be used in the calculation of the right camera pixel color.

After steps 906, 910, and 912, the method 900 can return to the step 902 until there are no more pixels in the right camera view, as indicated by step 914.

The right image computed by the method 900 of FIG. 9A can contain pixels either valid or marked as being occluded pixels. The pixels now marked as occluded may be filled with color values from the left image using a method shown in FIG. 9B.

Figure 9B:
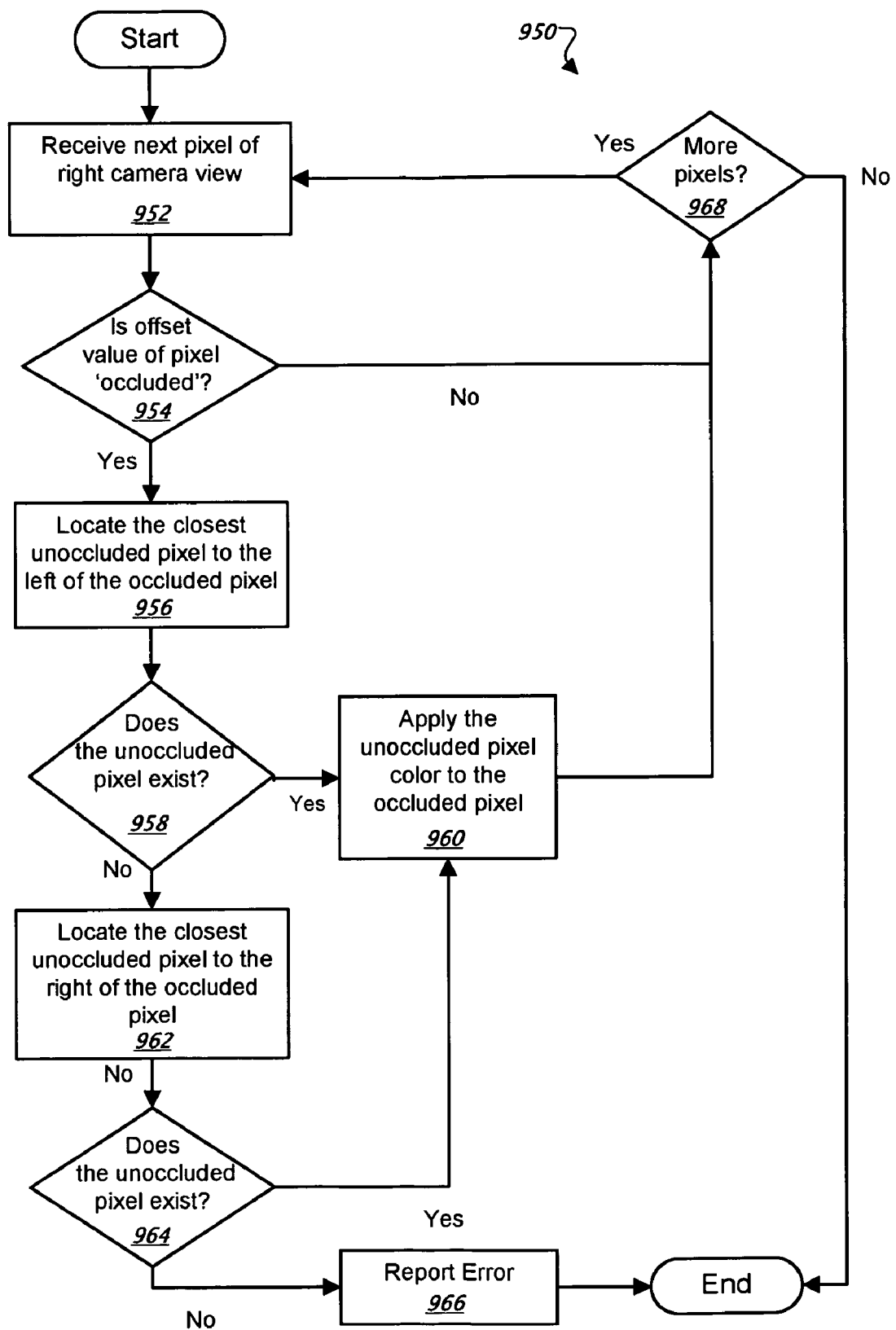

FIG. 9B shows a method 950 that assigns to pixels that are marked as occluded color values from the left image. More specifically, the color values can be obtained from unoccluded pixels in the left image that are nearest the occluded pixel.

In step 952, the 2D-to-3D converter can receive the next pixel of the right camera view. The 2D-to-3D converter can determine if the offset value associated with the pixel is marked as occluded, as shown in step 954.

If the pixel is occluded, the converter can attempt to locate the closest unoccluded pixel to the left of the occluded pixel, as shown in step 956. A determination is then made whether this unoccluded pixel exists (e.g., whether or not the closest pixel to the left is an unoccluded pixel), as shown in step 958.

If an unoccluded pixel is present, the converter can apply the unoccluded pixel color to the occluded pixel, as shown in step 960. If the unoccluded pixel is not present to the left of the occluded pixel, the converter can attempt to locate the closest unoccluded pixel to the right of the occluded pixel, as shown in step 962.

Next, the converter can determine whether an unoccluded pixel exists to the right of the occluded pixel, as shown in step 964. If an unoccluded pixel does exist, the step 960 is performed. If the unoccluded pixel does not exist, the converter may report an error, as shown in step 966 and end the method 950.

After step 954, which determines whether the pixel is occluded, and after step 960, which applies a color to the occluded pixels, the converter can determine if there are more pixels from the right camera view to process, as shown in step 968. If there are more pixels, the method 950 may execute the operations shown in step 952, and if there are no more pixels, the method 950 may end.

FIGS. 10A and 10B illustrate a difference between a parallel camera orientation and a "toed-in" orientation, respectively. In certain embodiments, the 2D-to-3D converter 110 can position the left camera 216 and the right camera 222 so that they are viewing a scene that includes a rectangle 1002 in parallel. In other embodiments, the 2D-to-3D converter 110 can position the left camera 216 and the right camera 222 so that their respective views converge at a location designated by a point 1004. In certain embodiments, and in certain scenes, it is helpful for the cameras to converge on a main object to help enhance the 3D affect. For instance, converging on a chair in the center of the scene can help bring it to the forefront, while other objects behind the chair appear to fall into the distance.

However, converging camera views also may create adverse side effects. One such effect may include keystone distortion. Keystone distortion can change how shapes are perceived. For instance, the rectangle 1002 when viewed in parallel can look like a trapezoid 1006 when viewed through a converging left camera 216 and right camera 222. In certain embodiments, the 2D-to-3D converter 110 can correct keystone distortion by generating a new right camera, using a geometrical transformation between the new right camera and the original right camera 222, parallel to the original left camera 216. A method for keystone correction is described in more detail in FIG. 11.

Figure 11:
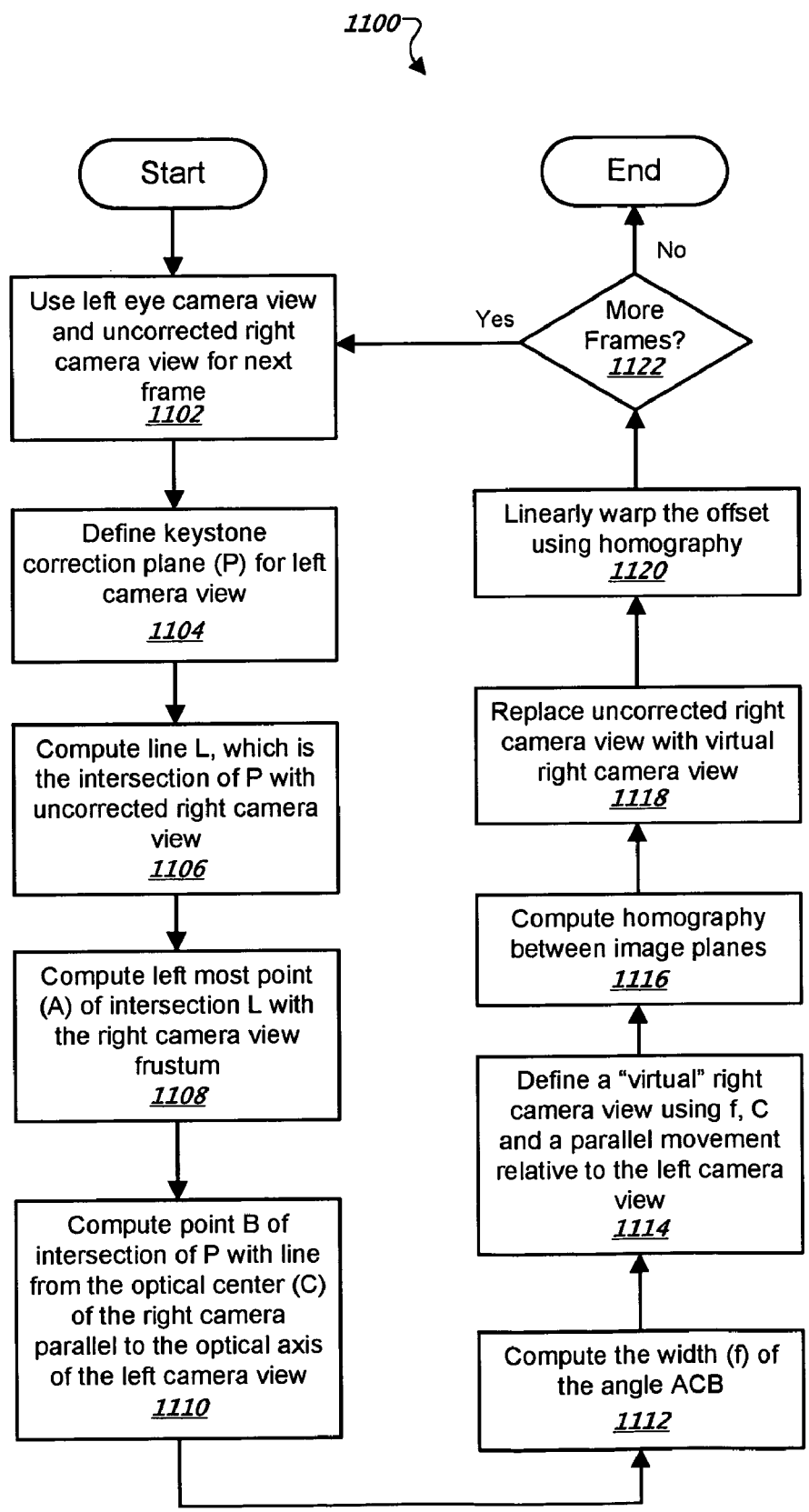
FIG. 11 is a flow chart illustrating a method for correcting differences between camera orientations.

FIG. 11 illustrates a method 1100 for correcting the difference between a parallel camera orientation and a "toed-in" orientation. The correction algorithm allows the 2D-to-3D converter 110 to regard the cameras as parallel in subsequent computations (e.g., executing blurring algorithms or executing infilling algorithms). The 2D-to-3D converter 110 can receive the left camera information 202, which includes an image plane, and the uncorrected right camera 222, which also includes an image plane, as shown in step 1102. An image plane is a plane perpendicular to a right camera 222 or a left camera 216 where a 2D or 3D image can be generated.

The 2D-to-3D converter 110 can then generate a three-dimensional plane P parallel to the left camera's image plane at a distance specified by the user of the 2D-to-3D converter 110, as shown by step 1104. In certain embodiments, the 2D-to-3D converter 110 can compute a three-dimensional line L, defined as the intersection of plane P with the (X, Z) horizontal plane of the original right camera's coordinate frame, as shown by step 1106.

As shown in step 1108, the 2D-to-3D converter 110 can compute a leftmost point A of the intersection L with the right camera's view frustum. The 2D-to-3D converter 110 can then compute a point B of an intersection of P with the line L from the optical center C of the of the right camera 222 parallel to the optical axis of the left camera, as shown in step 1110. The 2D-to-3D converter 110 can use the points A, B, and C to computer an angle F using geometry principles, as shown in step 1112.

As shown in step 1114, the 2D-to-3D converter 110 can use the angle F as the new right camera's field of view and the optical axis C as the new camera's optical axis to generate a new right camera that includes a reference frame parallel to the left camera 216.

As show in step 1116, the 2D-to-3D converter 110 can create a homography between the two image planes. A homography (also known as collineation) is a two-dimensional mathematical transformation in matrix form that specifies a point-to-point mapping from one image into another image. For example, a homography can define a point-to-point mapping from the original right camera 222 images to the new right camera images. As shown in step 1118, the 2D-to-3D converter 110 can replace the original uncorrected right camera 222 with the new corrected right camera.

In subsequent computations (e.g., blurring or infilling), if the 2D-to-3D converter references a pixel in the right camera view 108, the 2D-to-3D converter 110 can assume the reference pixel is in the new corrected right camera. The 2D-to-3D converter 110 can use the computed homography to access the pixels in the original right camera 222. For example, when the 2D-to-3D converter 110 receives pixel coordinates or values in the new right camera the 2D-to-3D converter 110 can use the homography to map back to the pixels in the original right camera 222.

As shown in step 1120, the 2D-to-3D converter 110 can also linearly warp the offset maps according to the homography. The correction algorithm processes each scene in the system until there are no more scenes to compute, as shown in step 1122.

Figure 12:
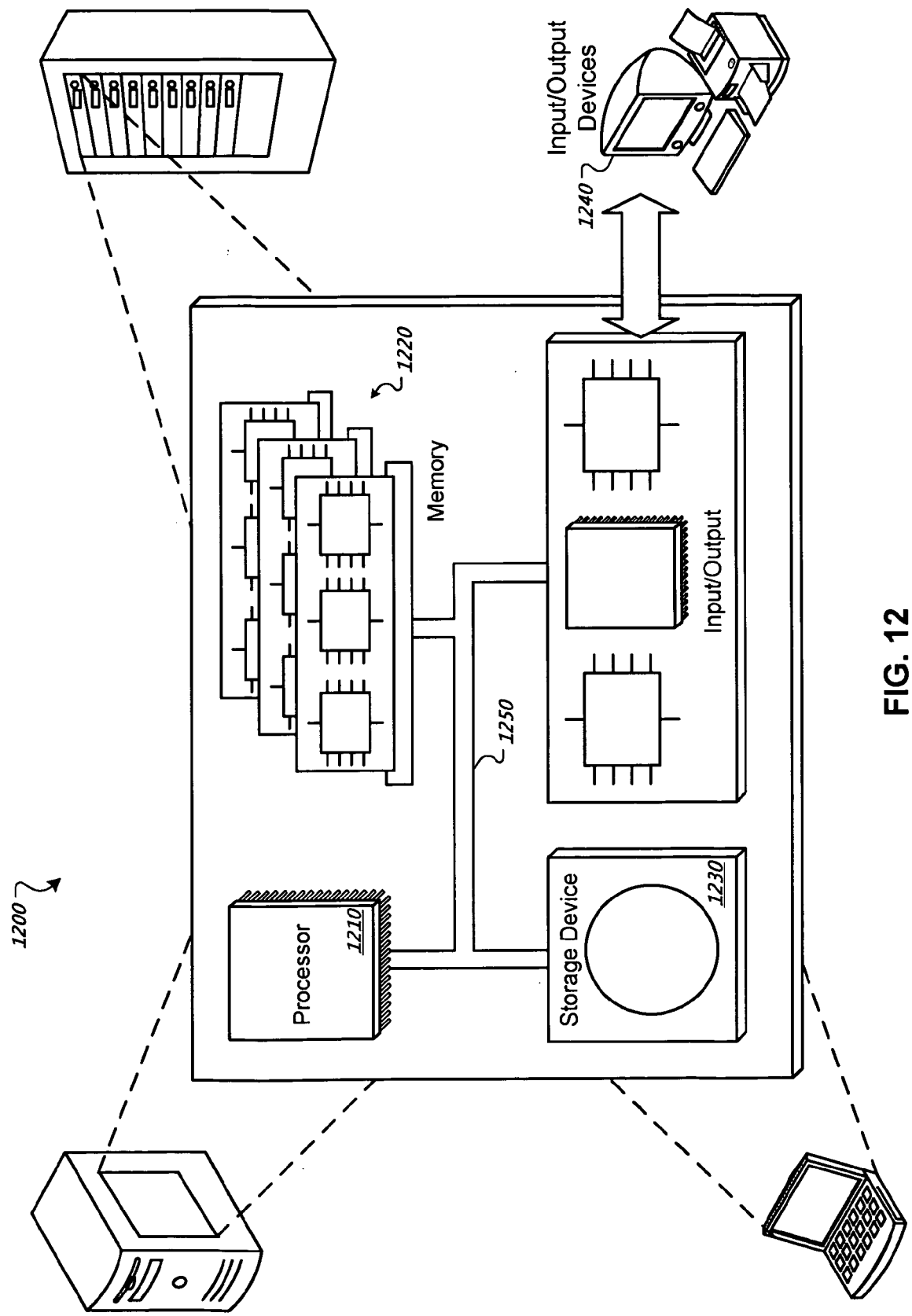
FIG. 12 is a block diagram of a general computer system.

FIG. 12 is a schematic diagram of an example of a generic computer system 1200. The system 1200 can be used for the operations described in association with the method 300 according to one implementation.

The system 1200 includes a processor 1210, a memory 1220, a storage device 1230, and an input/output device 1240. Each of the components 1210, 1220, 1230, and 1240 are interconnected using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of systems and methods for 2D to 3D image conversion have been described. Nevertheless, it will be understood that various modifications may be made without departing from the spirit and scope of the described embodiments. For example, the first camera view can include the right camera view and the second camera view can include the left camera view. For example, the 2D-to-3D converter 110 can receive the right camera view and use the right camera view to construct a left camera view.

The computer-generated geometry can include geometry that is designed by an artist to match an object depicted in the 2D information. The geometry can also include approximate geometry that loosely matches, or corresponds, with the depicted shape. In certain embodiments, the geometry and depth information is generated by the 2D-to-3D converter based on computer vision techniques that analyze images included in the 2D image information.

Additionally, occluded pixels can be detected using other methods. For example, the 2D-to-3D converter can detect occluded pixels by virtually simulating a light using the left camera. The light simulated using the camera can illuminate the geometry associated with the object in the left image. The converter can simulate viewing the illuminated geometry from the right camera, and using standard shadowing techniques, for example, ray tracing or depth buffering, to determine which areas of the geometry are in shadow. The converter then can interpret these shadowed areas as occluded.

In certain embodiments, the 2D-to-3D converter can detect pixels that are outside the left camera's field-of-view by simulating a light using the left camera. For example, the left camera can illuminate the geometry associated with the object in the left image. The converter can interpret the areas of the geometry that are not illuminated by the light from the left camera (as opposed to shadowed by the light from the left camera) as external to the field-of-view for the left camera.

In yet other embodiments, the 2D-to-3D converter can determine offset values between pixels in the left image and the right image by treating the left camera as a light. The converter can compute a color for each illuminated point that corresponds to the 2D offset for the pixel that will be rendered by the right camera. The appropriate offset for each pixel in the right image can then be determined by rendering the illuminated geometry from the right-hand camera. The illuminated pixels have valid offsets because only pixels that are unoccluded are lit (e.g., the occluded pixels are shadowed). After rendering the right image, the converter can compare corresponding pixels in the left and right images to determine the offset values for each pixel.

Additionally, although the specification describes the left and right images as pixels, in certain embodiments, the 2D-to-3D converter can process an image as a continuous field of color or as a point specified by coordinates. A pixel from the right camera view can be associated with a point in the continuous color field and not with a pixel from the left camera view. For example, to determine a color value for the right camera pixel, the converter can filter values from several left-hand pixels that are all associated with a point in the field.

In still other embodiments, missing image information from one frame can be painted, or associated, with image information from a future or past frame in a sequence of frames, for example, as sequence of film frames. For example, a camera view can change relative to an object as a sequence of frames progresses. If a right image of the frame lacks image data (e.g., if the image data is obscured from a left camera view), the 2D-to-3D converter can use image data that corresponds to the lacking image data from frames that occurred before or after the frame that lacks image data. For example, a previous frame may include image information of the backside of an object because the camera was positioned behind the object. The image information for the backside can then be used to paint pixels in a frame that lacks image data corresponding to the backside of the object.

In certain embodiments, the converter uses this process to fill in missing image information for objects in an image that have a predictable or a rigid shape. The predictability or rigidity can be used by the converter to correlate portions of the object in future or past frames with portions of the object in the current frame that lack image information.

In other embodiments, the infilling methods, such as the methods shown in FIGS. 7A and 7B, can additionally include texture synthesis techniques to fill in missing image information. Accordingly, other embodiments are within the scope of the following claims.

What is claimed is:

1. A method of identifying an absence of image information when generating a complementary stereoscopic image pair, the method comprising:

projecting at least a portion of a first 2D image comprising image information onto computer-generated geometry from a first camera having a first viewing frustum at a first camera location;

designating a second camera having a second viewing frustum at a second camera location, wherein the second viewing frustum includes at least a portion of the computer-generated geometry;

determining depth values associated with the image information in the first viewing frustum and in the second viewing frustum, wherein each of the depth values indicates a distance between one of the cameras and a point in the projected first 2D image in the viewing frustum for the associated camera; and identifying an absence of valid image information in a stereoscopic image corresponding to the first 2D image by comparing the depth values for corresponding points of the projected first 2D image in the first and second viewing frustums.

2. The method of claim 1, wherein the image information comprises one or more pixels or a portion of a continuous color field specified by coordinates.

3. The method of claim 1, further comprising identifying an absence of valid image information if a point in the second viewing frustum does not have a corresponding image information in the first viewing frustum.

4. The method of claim 1, further comprising rendering, using the computer-generated geometry, the second camera location, and the second viewing frustum, a second 2D image that is stereoscopically complementary to the first 2D image.

5. The method of claim 1, wherein the comparison of the depth values comprises determining if a difference between a depth value associated with image information from the first viewing frustum and a depth value associated with corresponding image information from the second viewing frustum exceeds a threshold.

6. The method of claim 5, wherein the absence of valid image information is identified if the threshold is exceeded.

7. The method of claim 1, further comprising receiving the computer-generated geometry.

8. The method of claim 1, further comprising generating the computer-generated geometry based on the received first 2D image.

9. The method of claim 1, further comprising generating the computer-generated geometry based on physical models of objects depicted in the first 2D image.

10. The method of claim 1, wherein the first 2D image comprises a final image of a motion picture.

11. The method of claim 1, further comprising deriving the first camera location from first camera information.

12. The method of claim 11, further comprising receiving the first camera information selected from a group consisting of aspect information, field-of-view information, and information associated with objects included in the first 2D image.

13. The method of claim 1, wherein the second camera location is horizontally offset from the first camera location.

14. The method of claim 1, wherein the depth values further comprise background identifiers that indicate associated image information has a depth value greater than a background threshold.

15. The method of claim 1, further comprising receiving non-rendered elements.

16. The method of claim 15, further comprising receiving a compositing script comprising instructions used to combine non-rendered elements and the geometry in the rendering.

17. A method comprising:

projecting at least a portion of a first 2D image comprising image information onto computer-generated geometry from a first camera having a first viewing frustum at a first camera location; and generating, at a second camera location by a second camera having a second viewing frustum that includes at least a portion of the computer-generated geometry, a second 2D image that is stereoscopically complementary to the first 2D image, wherein the generated second 2D image is based upon the computer-generated geometry upon which is projected the portion of the first 2D image, wherein optical axes of the first and second cameras are substantially parallel.

18. The method of claim 17, further compromising generating a stereoscopic pair comprising the first 2D image and a second 2D image based on image information included in the second viewing frustum of the second camera.

19. The method of claim 17, further comprising generating a third camera having a third viewing frustum at a third camera location, wherein the third viewing frustum includes at least a portion of the computer-generated geometry, wherein optical axes of the first and third camera are not substantially parallel.

20. The method of claim 19, wherein the second camera is generated based on the third camera.

21. The method of claim 19, further comprising computing homography between image planes associated with the second and third cameras.

22. The method of claim 21, further comprising substituting the third camera with the second camera for use in rendering a second 2D image.

23. The method of claim 22, further comprising using the homography to map offsets associated with the second camera that were generated in the rendering to offsets associated with the third camera.

24. A system for identifying an absence of valid pixel data in a stereoscopically complementary image comprising:

an interface to receive a first 2D image captured from a first camera position;

a projector to project a portion of the first 2D image onto computer-generated geometry that corresponds to the portion;

a rendering module to render from a second camera position a second 2D image that is stereoscopically complementary to the first 2D image using the projected portion and the computer-generated geometry; and a depth calculator to determine depths of image information in the first and second images for use in identifying an absence of valid image information in the second 2D image.

25. A computer program product tangibly embodied in a machine readable storage device, the computer program product including instructions that, when executed, perform operations comprising:

aligning computer-generated geometry with a corresponding portion of a first 2D image captured from a first camera location;
projecting the portion of the first 2D image onto the geometry;
designating a second camera location that differs from the first camera location;
using the geometry and the designated second camera location to render a second 2D image that is stereoscopically complementary to the first 2D image; and
identifying an absence of valid image information in the second 2D image by comparing depth values of image information from the first and second 2D images.

26. A method of identifying an absence of image information when generating a complementary stereoscopic image pair, the method comprising:
illuminating at least a portion of computer-generated geometry using a simulated light source positioned at a first camera location,
designating a second camera at a second camera location having a viewing frustum that includes the at least a portion of the computer-generated geometry; and
identifying an absence of valid image information at locations having shadows produced by the simulated light when the locations are viewed from the second camera.

27. The method of claim 26, further comprising identifying an absence of valid image information at points where there is an absence of any computer-generated geometry.

28. The method of claim 26, wherein the shadows indicate the associated locations are obscured when viewed from a first camera at the first camera location.

29. The method of claim 26, further comprising determining a location is external to a view from a first camera at the first camera location if the location is not illuminated by the simulated light.

30. The method of claim 29, further comprising assigning image information associated with the location external to the view from the first camera with offset values that specify the image information is categorized as outside.

31. A method of creating a complementary stereoscopic image pair, the method comprising:
receiving a first 2D image comprising image data, the first 2D image captured from a first camera location;
projecting at least a portion of the first 2D image onto computer-generated geometry, the image data having depth values associated with the computer-generated geometry; and
rendering a second 2D image that is stereoscopically complementary to the first 2D image, the rendering of the second 2D image based upon the computer-generated geometry upon which is projected the portion of the first 2D image and being performed at a second camera location that differs from the first camera location.

32. The method of claim 31, further comprising infilling image data that is absent from the second 2-D image.

33. The method of claim 31, wherein the image data comprises one or more pixels or a portion of a continuous color field specified by coordinates.

34. The method of claim 31, further comprising receiving the computer-generated geometry.

35. The method of claim 31, further comprising generating the computer-generated geometry based on the received first 2D image.

36. The method of claim 31, further comprising generating the computer-generated geometry based on physical models of objects depicted in the first 2D image.

37. The method of claim 31, wherein the first 2D image comprises a final image of a motion picture.

38. The method of claim 31, further comprising deriving the first camera location from first camera information associated with the image data of the first 2D image.

* * * * *

UNITED STATES PATENT AND TRADEMARK OFFICE
CERTIFICATE OF CORRECTION

PATENT NO. : 7,573,475 B2 Page 1 of 1
APPLICATION NO. : 11/445947
DATED : August 11, 2009
INVENTOR(S) : Steve Sullivan, Alan D. Trombla and Francesco G. Callari It is certified that error appears in the above-identified patent and that said Letters Patent is hereby corrected as shown below:

Column 18, line 26, in Claim 18, please delete "compromising" and insert --comprising--, therefor.

Signed and Sealed this

Twenty-second Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,573,475 B2
APPLICATION NO. : 11/445947
DATED : August 11, 2009
INVENTOR(S) : Sullivan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 582 days.

Signed and Sealed this

Seventh Day of September, 2010

David J. Kappos
*Director of the United States Patent and Trademark Office*